(12) United States Patent
Cervantes et al.

(10) Patent No.: US 6,929,541 B2
(45) Date of Patent: Aug. 16, 2005

(54) METHOD FOR MAKING A FOWL WING CUT AND THE RESULTANT PRODUCT

(75) Inventors: Julio S. Cervantes, Coldwater, OH (US); Helen R. Grunden, Maria Stein, OH (US); Roger A. Wellman, Bryant, IN (US); Michael J. Werling, St. Henry, OH (US)

(73) Assignee: V.H. Cooper & Company, Inc., St. Henry, OH (US)

( * ) Notice: Subject to any disclaimer, the term of this patent is extended or adjusted under 35 U.S.C. 154(b) by 102 days.

(21) Appl. No.: 10/400,767

(22) Filed: Mar. 27, 2003

(65) Prior Publication Data

US 2003/0186639 A1 Oct. 2, 2003

Related U.S. Application Data

(60) Provisional application No. 60/368,380, filed on Mar. 28, 2002.

(51) Int. Cl.$^7$ .............................................. A22C 21/00
(52) U.S. Cl. ...................................................... 452/149
(58) Field of Search ................................ 452/149, 169, 452/198, 135; 426/644, 518

(56) References Cited

U.S. PATENT DOCUMENTS

| | | | |
|---|---|---|---|
| 1,433,628 A | | 10/1922 | Knaust |
| 2,243,951 A | * | 6/1941 | Gehlke ........................ 452/160 |
| 2,267,442 A | * | 12/1941 | Clark ........................... 452/135 |
| 2,571,544 A | | 10/1951 | Cutrera ............................ 17/45 |
| 3,942,222 A | | 3/1976 | Strandine et al. ............... 17/45 |
| 4,207,653 A | | 6/1980 | Gasbarro ......................... 17/11 |
| 4,577,368 A | | 3/1986 | Hazenbroek .................... 17/11 |
| 4,716,626 A | | 1/1988 | Chiron et al. .................... 17/46 |
| 4,769,872 A | | 9/1988 | Hazenbroek et al. ........... 17/52 |
| 4,797,975 A | | 1/1989 | Soullard et al. ................ 17/46 |
| 4,938,988 A | * | 7/1990 | Fankhauser .................. 426/644 |

(Continued)

FOREIGN PATENT DOCUMENTS

FR 2566629 * 6/1984

OTHER PUBLICATIONS

Diagram of the Skeletal Anatomy of a Fowl, website www-.ca.uky.edu/agripedia/classes.*
Diagram of Cooking Tips, website www.eatchicken.com/cooking_tips/cutting_chicken.cfm.*
"How to Carve Meat"; author's name omitted by request; PageWise, Inc., 2001.
*The Good Housekeeping Illustrated Cookbook*, Revised & Expanded Edition, 1989; pp. 246–247.
"Broiler Chicken Deboning"; Denton, J.H.et al.; Texas Agricultural Experimental Station, Jun. 1988.
*The Southern Living Cookbook*; Payne, S.C.; Oxmoor House, 1987; pp. 384–385.
*The Making of a Cook*; Kamman, M.; Atheneum, New York, 1971; p. 155.

Primary Examiner—Thomas Price
(74) Attorney, Agent, or Firm—Kinney & Lange, P.A.

(57) ABSTRACT

The present invention is a method for cutting a fowl to create a meat cut which includes the radius bone and muscles (meat) adhering to the radius bone. The method involves separating the radius bone and muscles adhering to the radius bone from the carcass of the fowl, and then removing the radius bone and muscles adhering to the radius bone from the carcass of the fowl. The meat cut may be produced with the cutaneous tissues attached to the muscles adhering to the radius bone or with the cutaneous tissues removed from the muscles adhering to the radius bone to produce a skinless meat cut. The resulting meat cut contains a larger percentage of meat and is easier to consume. Alternatively, a portion of the muscles (meat) adhering to the radius bone can be removed to create a meat cut having less meat.

27 Claims, 6 Drawing Sheets

U.S. PATENT DOCUMENTS

| | | | |
|---|---|---|---|
| 5,078,644 A | 1/1992 | DiGerlando | 452/169 |
| 5,080,631 A | 1/1992 | Howard et al. | |
| 5,088,957 A | 2/1992 | Gagliardi, Jr. | 452/149 |
| 5,176,564 A | 1/1993 | Hazenbroek | 452/169 |
| 5,232,397 A | 8/1993 | Gagliardi, Jr. | 452/169 |
| 5,250,309 A | 10/1993 | Gagliardi, Jr. | 426/104 |
| 5,266,064 A | 11/1993 | Gagliardi, Jr. | 452/135 |
| 5,269,722 A | 12/1993 | Diesing et al. | 452/135 |
| 5,286,229 A | 2/1994 | Gagliardi, Jr. | 452/169 |
| 5,368,519 A | 11/1994 | Curtis et al. | 452/135 |
| 5,368,520 A | 11/1994 | Koch et al. | 452/165 |
| 5,372,539 A | 12/1994 | Kunig et al. | 452/136 |
| 5,429,549 A | 7/1995 | Verrijp et al. | 452/169 |
| 5,494,479 A | 2/1996 | Lindert et al. | 452/135 |
| 5,496,210 A | 3/1996 | Davis | 452/169 |
| 5,660,583 A | 8/1997 | Roberts | 452/136 |
| 5,951,392 A * | 9/1999 | Gagliardi | 452/125 |
| 6,007,416 A | 12/1999 | Janssen et al. | 452/135 |
| 6,200,614 B1 * | 3/2001 | Brawley | 426/644 |
| 6,277,020 B1 | 8/2001 | Stephens | 452/135 |
| 6,280,311 B1 | 8/2001 | Kuck | 452/135 |

* cited by examiner

METHOD FOR MAKING A FOWL WING CUT AND THE RESULTANT PRODUCT

CROSS-REFERENCE TO RELATED APPLICATION(S)

This application claims the benefit of U.S. Provisional Application No. 60/368,380 filed Mar. 28, 2002 for "METHOD FOR MAKING A FOWL WING CUT AND THE RESULTANT PRODUCT".

BACKGROUND OF THE INVENTION

The present invention relates to a method for cutting a fowl carcass. In particular, the present invention relates to a method for cutting a fowl carcass to create a fowl wing cut which includes the radius bone and muscles (meat) adhering to the radius bone and excludes the ulna bone.

There exists in the art examples of methods for cutting fowl. Such examples disclose a method that results in a fowl wing cut that includes both the ulna bone and radius bone. A wing cut that includes both bones makes it more difficult for a person to consume all available meat because the person must work around and between the bones. Additionally, prior art methods of cutting fowl produce a wing cut that provides a small amount of meat relative to the amount of bone on the cut. The present invention provides a method of cutting a fowl carcass that will produce a meaty and easy to consume fowl wing cut.

BRIEF SUMMARY OF THE INVENTION

The present invention is a process or method for cutting a fowl to create a meat cut which includes only the radius bone and muscles (meat) adhering to the radius bone. In one embodiment, the method involves first separating the radius bone and muscles adhering thereto from the carcass of the fowl, and then removing the radius bone and muscles adhering thereto from the carcass of the fowl.

In another embodiment, the method involves first cutting on a first side of the fowl carcass from a front of the fowl wing beginning at the level of an elbow and moving towards a first joint such that the cut extends parallel to the radius bone. The method then includes cutting through a portion of the first joint toward an ulna bone, and then cutting along the ulna bone towards a second joint. Finally, the method includes cutting away from the ulna bone and through a portion of the second joint to separate a meat cut from the carcass of the fowl, whereby the meat cut includes only the radius bone and muscles adhering thereto.

In a third embodiment, the method involves first supporting the fowl carcass such that a first side wing area of the fowl carcass is accessible, grasping a distal portion of a first fowl wing, and cutting from a front of the fowl wing beginning at the level of an elbow and moving towards a first joint such that the cut moves parallel to the radius bone and through a patagium. The method then includes separating the radius bone from the patagium, cutting through a portion of the first joint, twisting the fowl wing to dislocate the first joint cavity, and separating a humerus bone from the radius bone. The method then further includes continuing to cut along an ulna bone towards a second joint, cutting away from the ulna bone and through a portion of the second joint cavity such that the cut is between a distal end of the radius bone and a proximal area of a radial carpal bone, twisting the radius bone to dislocate the second joint, and then separating the meat cut from the first side wing area of the fowl carcass, whereby the meat cut includes only the radius bone and muscles adhering thereto.

BRIEF DESCRIPTION OF THE DRAWINGS

The present invention will be further explained with reference to the drawing figures referenced below, wherein like structure is referred to by like numerals throughout the several views.

Figure 1:
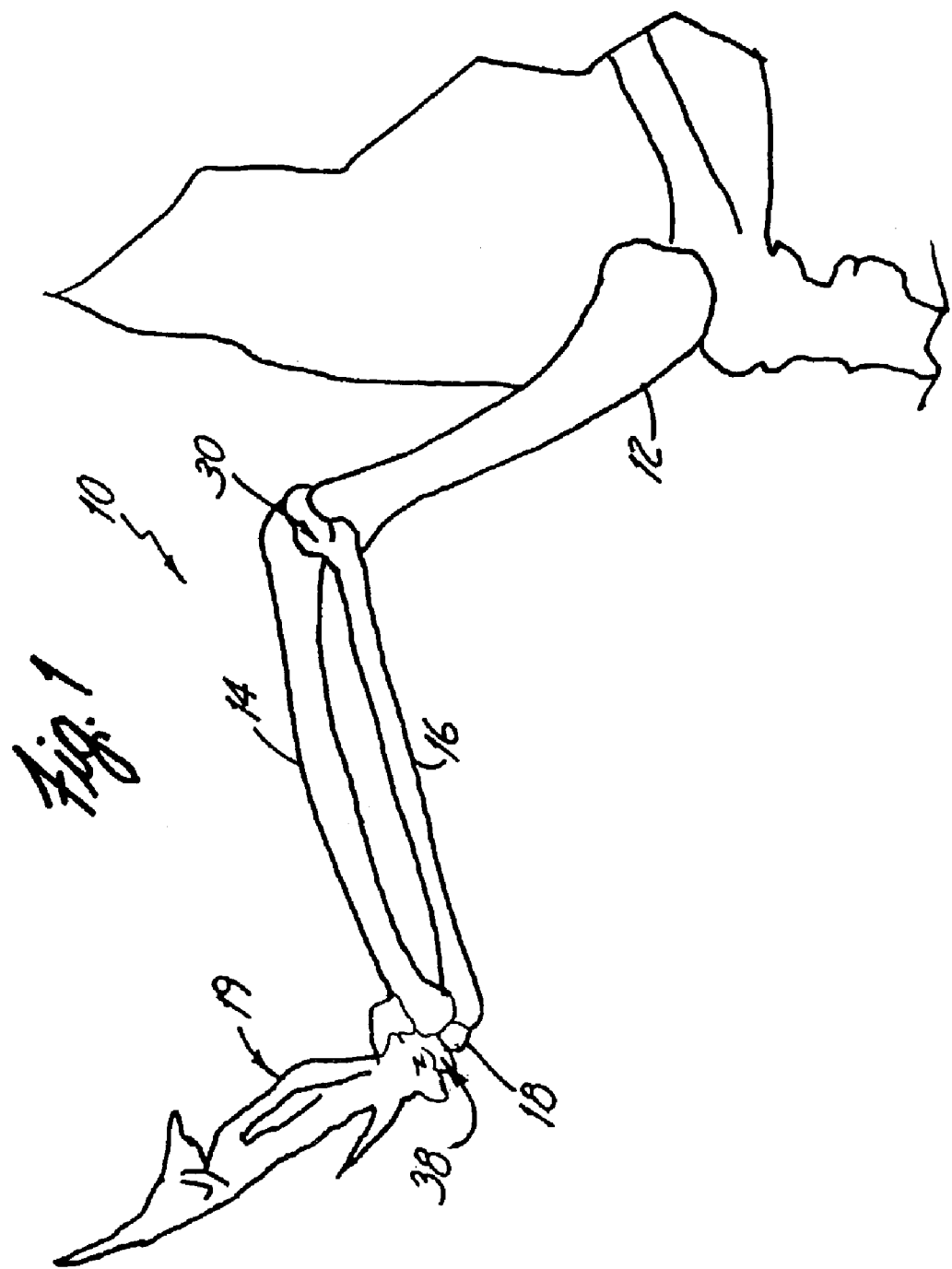
FIG. 1 is an enlarged skeletal view of the pectoral limb (wing) of a fowl.

While the above-identified drawing figures set forth one embodiment, other embodiments of the present invention are also contemplated, as noted in the discussion. This disclosure presents illustrative embodiments of the present invention by way of representation and not limitation. Numerous other modifications and embodiments can be devised by those skilled in the art which fall within the scope and spirit of the principles of this invention. The drawing figures are not drawn to scale.

DETAILED DESCRIPTION

The present invention is a method for cutting a fowl carcass to create an edible fowl wing cut that includes the radius bone and muscles (meat) adhering to the radius bone. In butchered meats, the wing cut generally consists of both the ulna bone and radius bone as well as the associated muscles. However, the present invention discloses a method for cutting a fowl's wing to create a single boned edible wing cut.

In recent years, convenience and quality of presentation have become increasingly important to both consumers and food service distributors (e.g., restaurants). The present invention is directed to the preparation and service of an innovative meat product, one which provides a discrete and easy to handle meat product that has a high meat-to-bone ratio. Such a product is quite suitable as an appetizer on a restaurant menu and can provide high profit margins for food service distributors, while also providing a high quality and meat-heavy product for the consumer (i.e., high product value from the consumer's perspective). While particularly suited to being served as a restaurant appetizer, the inventive meat product may also be sold for home preparation and consumption. In addition, since the meat is borne on only a single generally central bone, consumption is simplified.

FIG. 1 shows an enlarged skeletal view of the pectoral limb (wing) of a fowl. The fowl wing 10 includes a humerus bone 12, an ulna bone 14, a radius bone 16, a radial carpal bone 18 located at a posterior edge 19 of the wing 10, a first joint 30 and a second joint 38.

Figure 2:
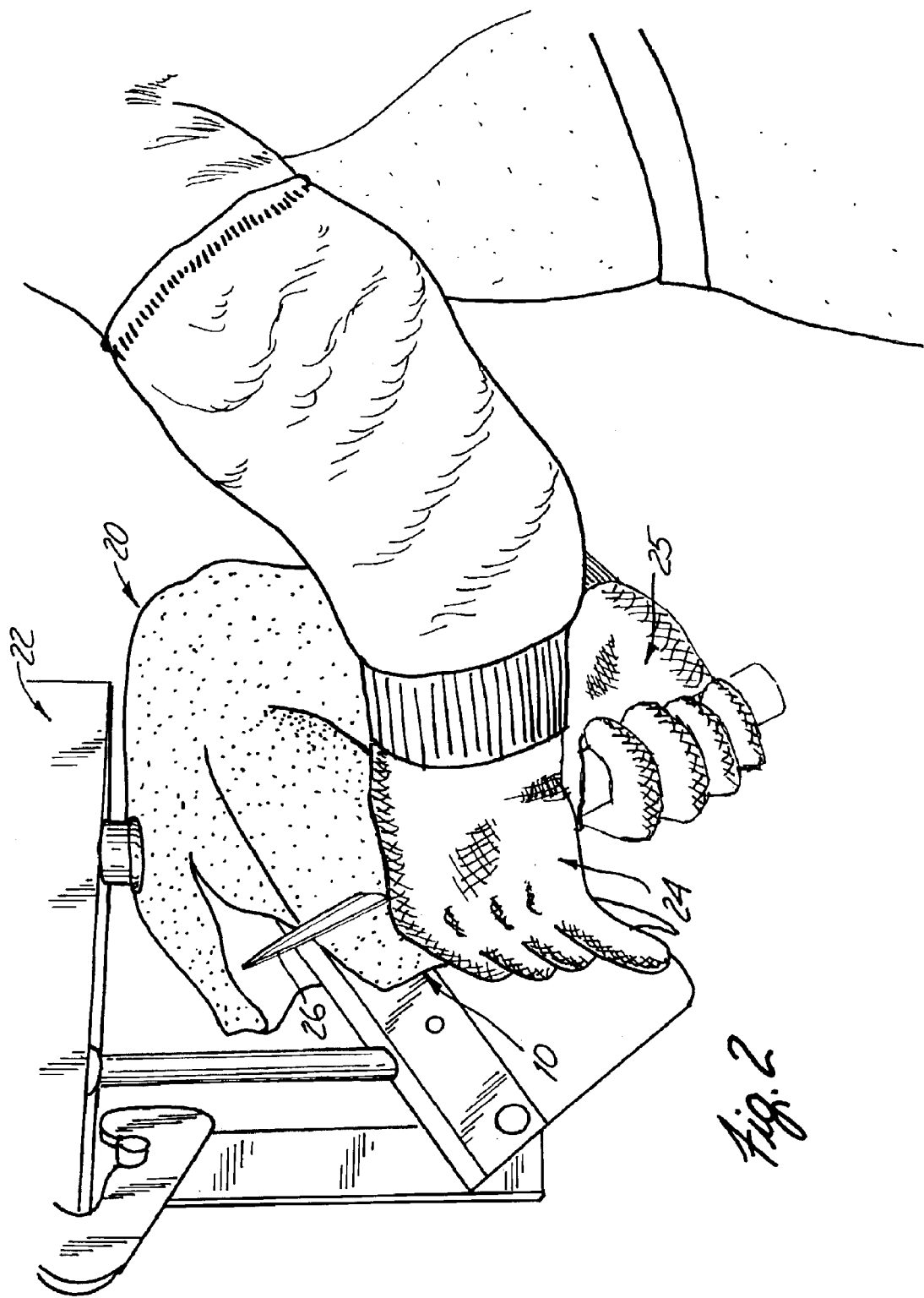
FIG. 2 is a perspective view of the set up for the butchering process of a fowl carcass.

FIG. 2 shows one illustrative environment for the butchering of a fowl carcass 20. Any arrangement for supporting the carcass 20 will suffice for practicing the present invention so long as the wing area of the fowl carcass 20 is suitably accessible for processing. In the illustrated example, the fowl carcass 20 is supported by a suitable apparatus 22, thereby freeing both of the butcher's hands (such as hands 24 and 25) for use in the process. The butcher is then able to grasp the fowl wing 10 in one hand 24 while handling a cutting utensil 26 (i.e., knife) in the other hand 25.

Figure 3:
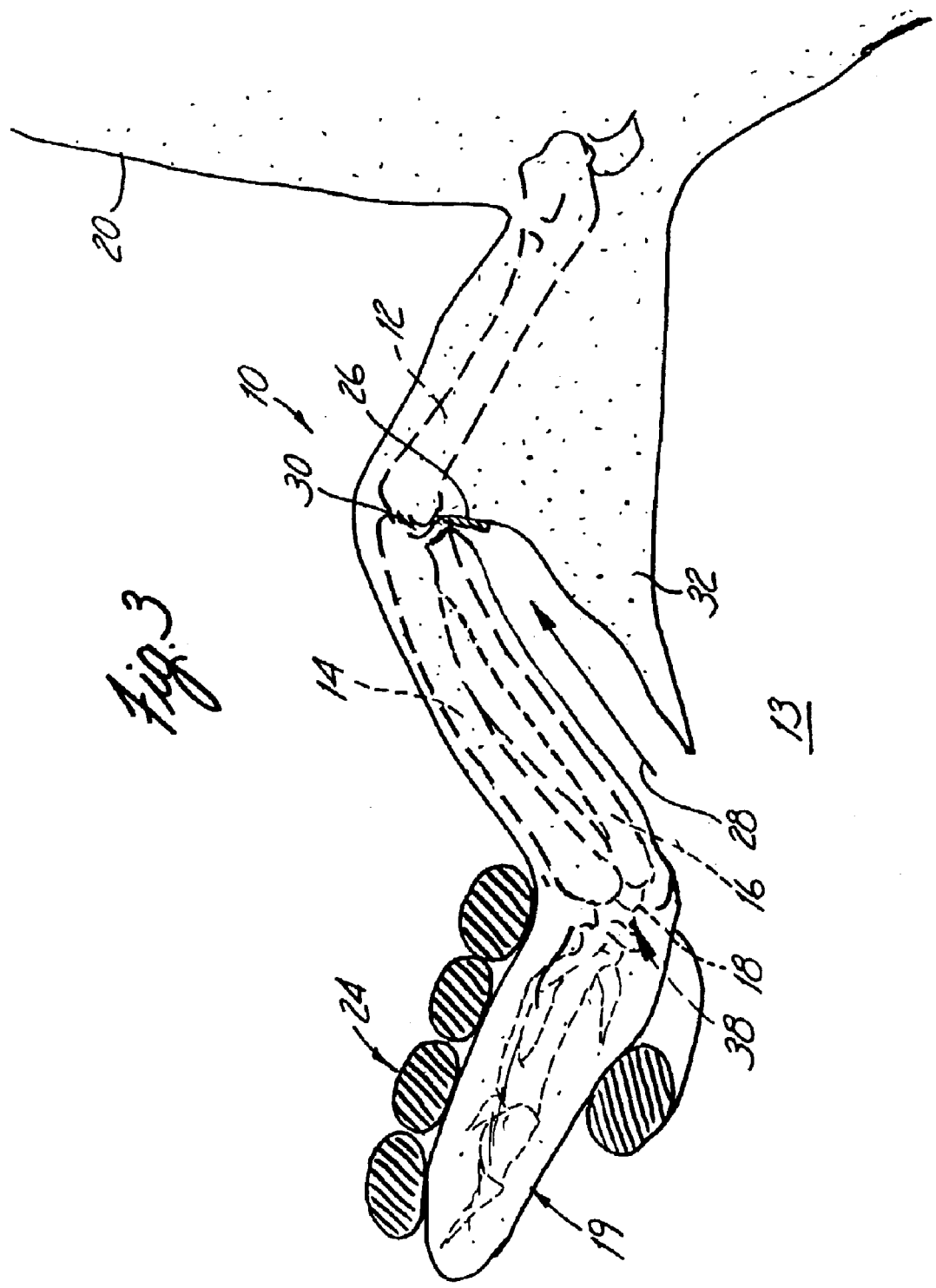
FIG. 3 is a perspective view of a fowl wing being butchered, showing a first cut starting at the level of the elbow.

FIG. 3 shows a first butchering incision 28 made in the fowl carcass 20. The incision is made while grasping a distal portion of the fowl wing 10. The first butchering incision 28 is from the front of the fowl wing 10 (from the "front" side 13, as shown in FIG. 3) beginning at the level of the elbow and moving towards a first joint 30. The first incision 28 cuts parallel to the radius bone 16 and through the patagium 32 (wing membrane). The first incision 28 separates the radius bone 16 from the patagium 32.

Figure 4:
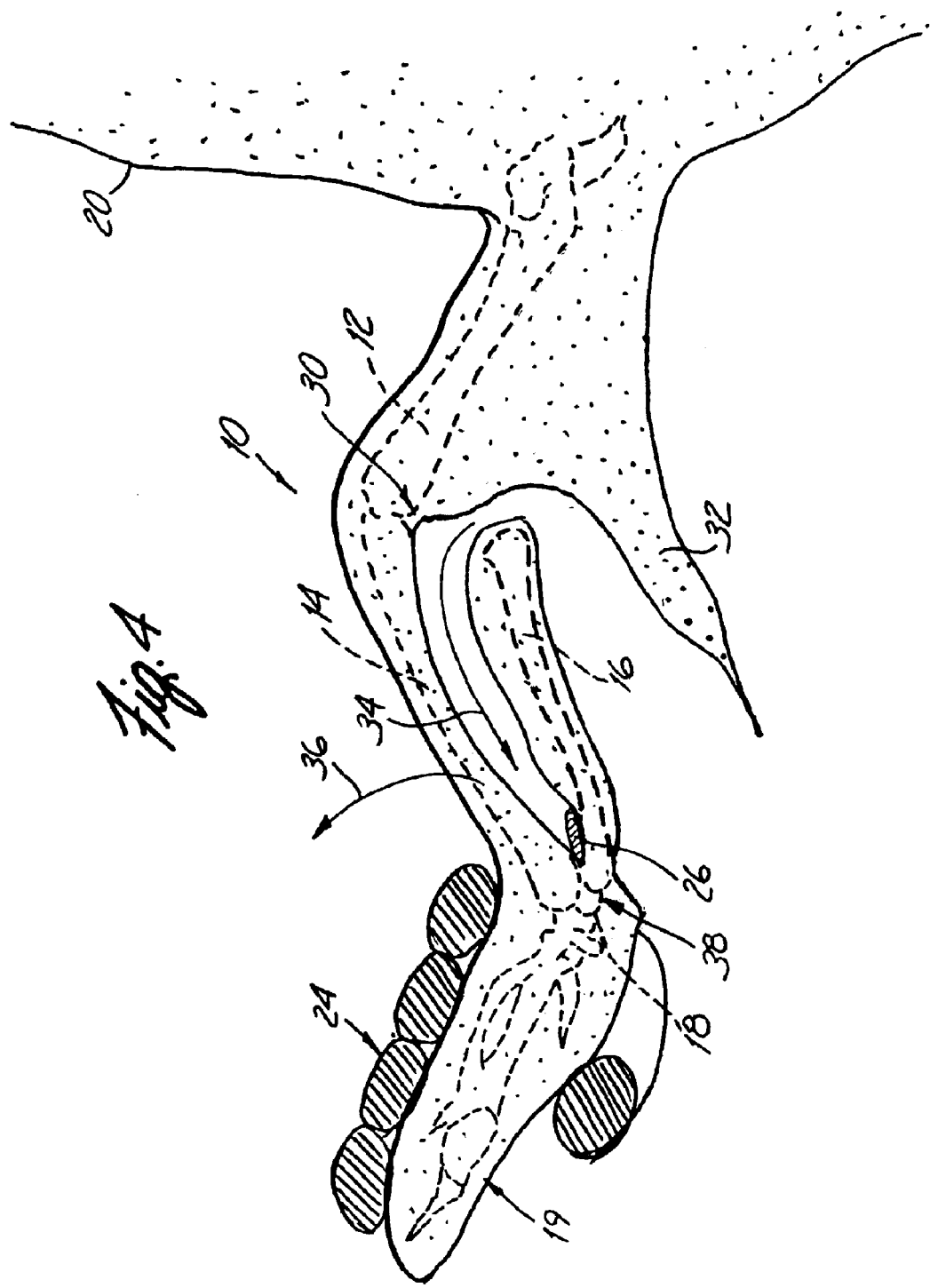
FIG. 4 is a perspective view of a fowl wing being butchered, showing a second cut made through the first joint and along the ulna bone.

FIG. 4 illustrates a second butchering incision 34 made in the fowl carcass 20. During the second incision 34, the cutting utensil 26 cuts through a portion of the first joint 30 toward the ulna bone 14 and continues roughly at a right angle to the major extent of the first incision 28. As the second incision 34 is made, the butcher (while grasping the fowl wing 10 in hand 24) twists the wing 10 generally in the direction of the arrow 36. (FIG. 4). The cutting and twisting of the fowl wing 10 separates the humerus bone 12 from the radius bone 16. Additionally, the twisting dislocates the first joint 30 between the humerus bone 12 and radius bone 16 allowing the cutting utensil 26 to pass through the portion of the first joint 30. Alternatively, the butcher can twist the wing 10 generally in the direction of the arrow 36 after the second incision 34 is completed. (FIG. 4). However, this could make it more difficult for the cutting utensil 26 to pass through the portion of the first joint 30.

As the second incision 34 continues, the cutting utensil 26 is drawn along the ulna bone 14 (in contact therewith) towards a second joint 38 located between the radial carpal bone 18 and the ulna bone 14 and the radius bone 16. The cutting utensil 26 is drawn generally in the direction of arrow 34 towards the second joint 38.

Figure 5:
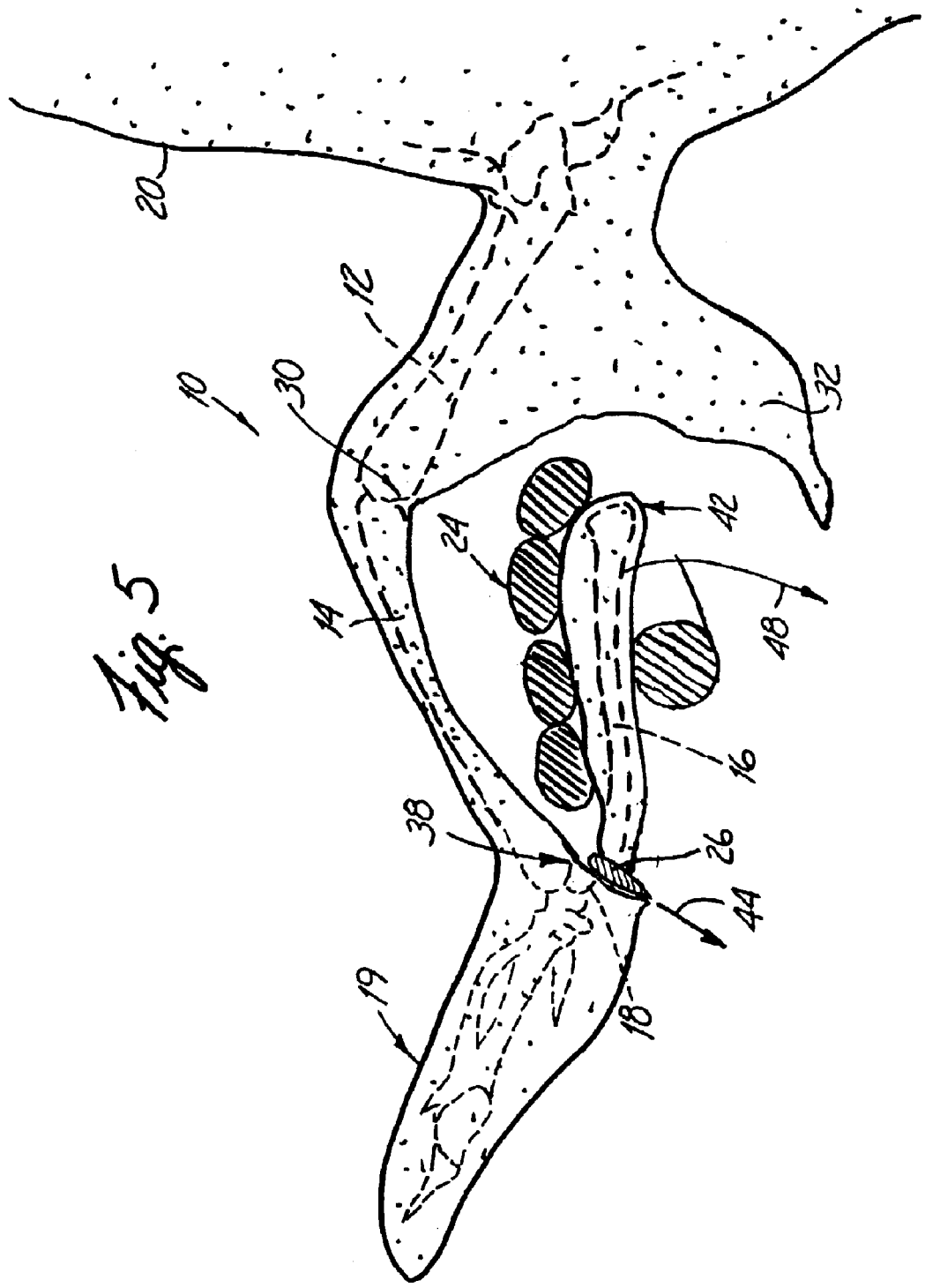
FIG. 5 is a perspective view of a fowl wing being butchered, showing a third cut, which effects removal of the edible fowl wing cut from the fowl carcass.

FIG. 5 shows the removal of an edible fowl wing cut 42 from the fowl carcass 20. The butcher removes the edible fowl wing cut 42 by moving the hand 24 to grasp the radius bone 16 along with the muscles (meat) adhering to the radius bone and skin. A final incision 44 is then made by moving the cutting utensil 26 to cut away from the ulna bone 14 and move through a portion of the second joint 38. The final incision 44 cuts between the distal end of the radius bone 16 and the proximal area of the radial carpal bone 18. As the final incision 44 is made, the butcher twists the radius bone 16 in the direction of arrow 48 (FIG. 5) to dislocate the joint cavity 38, allowing the cutting utensil 26 to cut through the a portion of the second joint 38. Once the cutting utensil 26 is through the portion of the second joint 38 and the associated muscles, the edible fowl wing cut 42 is separated from the remaining fowl wing 10 parts, and can be further individually processed as desired. Alternatively, the butcher can twist the radius bone 16 in the direction of arrow 48 after cutting away from the ulna bone 14. (FIG. 5). However, this could make it more difficult for the cutting utensil 26 to pass through the portion of the second joint 38.

Figure 6:
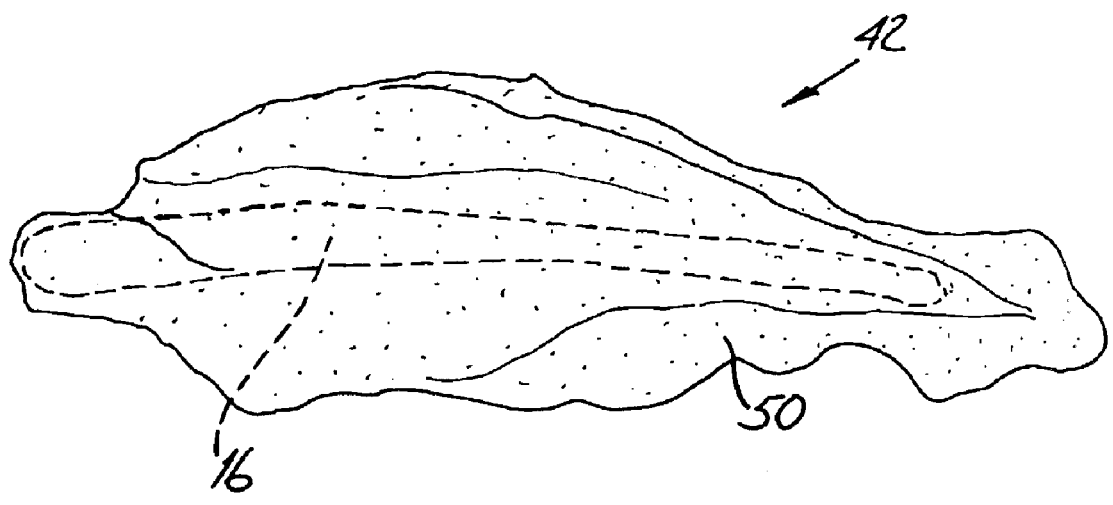
FIG. 6 is a perspective view of a completed edible fowl wing cut showing the radius bone, muscles (meat) and cutaneous tissues (skin).

FIG. 6 shows a completed edible fowl wing cut 42 of the present invention. The edible fowl wing cut 42 includes only the radius bone 16, muscles (meat) and cutaneous tissues (skin) 50 overlying these muscles. The edible fowl wing cut 42 contains the following muscles: M. Extensor Carpi Obliqus, M. Medialis Extensor Digiti, M. Extensor Et Adductor Digitorum, M. Pronator Longus, M. Pronator Brevis, M. Extensor Digiti Secundi Et Terti, M. Supinator Medialis, M. Supinator Lateralis and M. Extensor Carpi Radialis Profundus. Each fowl carcass 20 will produce two edible fowl wing cuts 42, one from the left side and one from the right side.

The final product is a single boned meaty fowl wing cut with meat along all sides of the radius bone 16. The skin may be left on the meat or removed, as desired. If left on, the skin totals 6–8% by weight of the cut 42. The final product has a meat-to-bone ratio of approximately 79.17% meat to 20.83% bone. A typical wing cut that includes both the ulna bone 14 and the radius bone 16 only has a meat-to-bone ratio of approximately 73.88% meat to 26.12% bone. Therefore, the completed edible fowl wing cut 42 is intended to have as much meat as possible on the radius bone 16 creating a high meat-to-bone ratio product that is easy to consume.

Although the present invention has been described with reference to one embodiment thereof, changes may be made in form and detail. For example, the description and figures refer specifically to a method for preparing wing cuts from the radius bone and adhering meat of a turkey. However, the method of the present invention could be applied to any fowl species including, but not limited to, turkeys, chickens, geese, pheasants, ducks, ostriches, or any other animal. Additionally, as noted above, the cutaneous tissues (skin) 50 can be removed from the wing cut 42, creating a skinless edible fowl wing cut. The skinless fowl wing cut allows individuals concerned with calorie intake and fat content to enjoy the wing cut 42 without consuming the skin. Alternatively, the muscles (meat) adhering to the radius bone 16 can be trimmed to create a less meaty edible wing cut and/or muscle (meat) can be left with the ulna bone 14 creating a smaller portion size.

Further, the method for cutting a fowl carcass to create an edible fowl wing cut can be performed in an alternative manner, such as performing the cutting and separating steps in a reverse order. This is done by first making an initial incision at the posterior edge 19 of the wing 10 at the level of the second joint 38 between the radius bone 16 and the radial carpal bone 18. The initial incision is made in the opposite direction of the incision 44. Second, the cutting utensil 26 is drawn into the second joint 38 between the radius bone 16 and the radial carpal bone 18. Third, the cutting utensil 26 is turned to make an incision along the ulna bone 14 towards the first joint 30. The third incision is made in the opposite direction of the incision 34. After the cutting utensil 26 enters the first joint 30, it is turned to provide a transverse cut through the patagium 32 (the wing membrane) to exit the wing 10. The transverse cut is made in the opposite direction of the incision 28. The transverse cut separates the radius bone 16 from the humerus bone 12 and completes the separation of the edible fowl wing cut 42 from the remaining fowl wing 10 parts.

No matter what technique is used to separate the fowl wing cut 42 from the wing 10, the fowl wing cut 42 can then be further processed as desired (e.g., frozen, seasoned, cooked, etc.) to create a final servable food product. The fowl wing cut 42 can be sold as a raw cut, marinated or non-marinated, or after further processing.

Although the present invention has been described with reference to preferred embodiments, workers skilled in the art will recognize that changes may be made in form and detail without departing from the spirit and scope of the invention.

What is claimed is:

1. A method for forming a meat cut from a carcass of a fowl, the method comprising:
   the first step of separating a radius bone and muscles adhering to the radius from an ulna bone of a fowl wing attached to a carcass; and after said first step, then
   removing the radius bone and muscles adhering to the radius bone from the carcass of the fowl.

2. The method of claim 1 wherein after removing the radius bone and muscles adhering to the radius bone from the carcass of the fowl, the muscles adhering to the radius bone include muscles from the group consisting of a M. Extensor Carpi Obliqus, a M. Medialis Extensor Digiti, a M. Extensor Et Adductor Digitorum, a M. Pronator Longus, a M. Pronator Brevis, a M. Extensor Digiti Secundi Et Terti, a M. Supinator Medialis, a M. Supinator Lateralis and a M. Extensor Carpi Radialis Profundus.

3. The method of claim 1 wherein a cutaneous tissue covering the muscles adhering to the radius bone is removed, creating a skinless meat cut.

4. The method of claim 1 wherein portions of the muscles adhering to the radius bone are removed.

5. The method of claim 1 further comprising:
marinating the radius bone and muscles adhering to the radius bone.

6. A method of cutting a fowl carcass to create a fowl wing that includes only a radius bone and muscles adhering to the radius bone, the method comprising:
cutting on a first side of the fowl carcass from a front of the fowl wing beginning at the level of an elbow and moving towards a first joint such that the cut extends parallel to the radius bone;
cutting through a portion of the first joint toward an ulna bone;
cutting along the ulna bone towards a second joint; and
cutting away from the ulna bone and through a portion of the second joint to separate a meat cut from the carcass of the fowl, which includes only the radius bone and muscles adhering to the radius bone.

7. The method of claim 6 wherein the first cut separates the radius bone from a patagium.

8. The method of claim 6 wherein the first joint is located between the humerus bone and the radius bone.

9. The method of calm 6 wherein the second joint is located between a radial carpal bone and the ulna bone and the radius bone.

10. The method of claim 6 wherein the same radius bone removal method is repeated on a second side of the fowl carcass, resulting in the carcass yielding two meat cuts having the same radius bone and the muscles adhering to the radius bone separated from the carcass of the fowl.

11. The method of claim 6, and further comprising:
twisting the fowl wing while simultaneously cutting through the portion of the first joint.

12. The method of claim 6, and further comprising:
twisting the fowl wing after cutting through the portion of the first joint.

13. The method of claim 6, and further comprising:
twisting the radius bone while simultaneously cutting away from the ulna bone and through the portion of the second joint.

14. The method of claim 6, and further comprising:
twisting the radius bone after cutting away from the ulna bone and through the portion of the second joint.

15. The method of claim 6, wherein after removing the radius bone and muscles adhering to the radius bone from the carcass of the fowl, the muscles adhering to the radius bone include muscles from the group consisting of a M. Extensor Carpi Obliqus, a M. Medialis Extensor Digiti, a M. Extensor Et Adductor Digitorum, a M. Pronator Longus, a M. Pronator Brevis, a M. Extensor Digiti Secundi Et Terti, a M. Supinator Medialis, a M. Supinator Lateralis and a M. Extensor Carpi Radialis Profundus.

16. The method of claim 6, wherein a cutaneous tissue covering the muscles adhering to the radius bone is removed, creating a skinless meat cut.

17. The method of claim 6 wherein portions of the muscles adhering to the radius bone are removed.

18. The method of claim 6 further comprising:
marinating the radius bone and muscles adhering to the radius bone.

19. A method of cutting a fowl carcass to create a fowl meat cut that includes a radius bone and muscles adhering to the radius bone, the method comprising:
supporting the fowl carcass such that a first side wing area of the fowl carcass is accessible;
grasping a distal portion of a first fowl wing;
cutting from a front of the fowl wing beginning at the level of an elbow and moving towards a first joint such that the cut moves parallel to the radius bone and through a patagium;
separating the radius bone from the patagium;
cutting through a portion of the first joint;
twisting the fowl wing to dislocate the first joint;
separating a humerus bone from the radius bone;
continuing to cut along an ulna bone towards a second joint;
cutting away from the ulna bone and through a portion of the second joint such that the cut is between a distal end of the radius bone and a proximal area of a radial carpal bone;
twisting the radius bone to dislocate the second joint; and
separating the meat cut from the first side wing area of the fowl carcass, which includes only the radius bone and muscles adhering to the radius bone.

20. The method of claim 19 wherein the first joint is located between the humerus bone and the radius bone.

21. The method of claim 19, and further comprising:
twisting the fowl wing while simultaneously cutting through the portion of the first joint.

22. The method of claim 19, and further comprising:
twisting the radius bone while simultaneously cutting away from the ulna bone and through the portion of the second joint.

23. The method of claim 19 wherein the second joint is located between the radial carpal bone and the ulna bone and the radius bone.

24. The method of claim 19 wherein after removing the radius bone and muscles adhering to the radius bone from the carcass of the fowl, the muscles adhering to the radius bone include muscles from the group consisting of a M. Extensor Carpi Obliqus, a M. Medialis Extensor Digiti, a M. Extensor Et Adductor Digitorum, a M. Pronator Longus, a M. Pronator Brevis, a M. Extensor Digiti Secundi Et Terti, a M. Supinator Medialis, a M. Supinator Lateralis and a M. Extensor Carpi Radialis Profundus.

25. The method of claim 19 wherein a cutaneous tissue covering the muscles adhering to the radius bone is removed, creating a skinless meat cut.

26. The method of claim 19 wherein portions of the muscles adhering to the radius bone are removed.

27. The method of claim 19 further comprising:
marinating the radius bone and muscles adhering to the radius bone.

* * * * *